United States Patent Office 2,713,037
Patented July 12, 1955

2,713,037

METHOD OF MAKING ALUMINA CONTAINING CATALYSTS

Charles N. Kimberlin, Jr., Baton Rouge, La., assignor to Esso Research and Engineering Company, a corporation of Delaware No Drawing. Application July 31, 1951,
Serial No. 239,613

8 Claims. (Cl. 252—453)

This invention relates to a process for the preparation of contact or catalytic substances such as alumina or alumina based catalysts or contacting agents and methods of treating hydrocarbons such as hydroforming, catalytic cracking etc. using said catalysts or contacting agents.

It is the object of this invention to provide an improved economical and practical process for the preparation of alumina or alumina-containing catalysts or contacting agents by the hydrolysis of the alcoholate of aluminum and recovering the alcohol for reuse.

According to the present invention the aluminum alcoholate made from the water soluble or water insoluble alcohols or mixtures thereof is hydrolyzed with a silica hydrosol to form a silica alumina composite or is hydrolyzed with an aqueous impregnating solution to form an impregnated hydrous alumina.

It is a further object of this invention to treat hydrocarbons as by hydroforming, catalytic cracking and the like in the presence of alumina-containing or alumina based catalysts or contacting agents made according to the present process.

Factors which contribute to the commercial practicability of this invention include (1) the low cost of aluminum metal compared with any of the aluminum salts as a source of alumina, (2) the elimination of all necessity for washing, and (3) the simplicity of the processing steps involved in the manufacture of the products.

In addition, when using the water insoluble alcohols, substantially complete alcohol recovery following hydrolysis is readily obtained by decantation. With water soluble alcohols recovery is best accomplished by fractional distillation and dehydration by azeotropic distillation.

The materials prepared in accordance with the present process are characterized by high purity and high surface area.

According to the present invention an aliphatic alcohol which is soluble or insoluble in water is reacted with metallic aluminum to form aluminum alcoholate.

For the present process the alcohol must be essentially anhydrous. The alcohols which may be used in this process include ethyl, propyl, isopropyl, n-butyl alcohol, secondary butyl alcohol, isobutyl alcohol, pentanol-1, pentanol-2, 3-methyl butanol-1, 2 methyl butanol-3, pentanol-3, hexanol-1, hexanol-2, hexanol-3, the various methyl pentanols, the various dimethyl butanols, the various heptyl alcohols, the various octyl alcohols, etc. including those higher alcohols liquid at the temperature of operation of the process.

Instead of using any one of the alcohols singly, mixed alcohols such as mixed amyl alcohols may be used. Mixtures of alcohols of different molecular weights may be used.

In order to further facilitate the separation of the alcohol from the water when using a water insoluble alcohol a hydrocarbon, such as a petroleum distillate boiling within the range of 200° F. to 500° F. or higher, preferably of narrow boiling range which includes the boiling range of the alcohol used, may be added to the alcohol. Instead of using a hydrocarbon fraction, selected hydrocarbons such as heptane, octane, toluene, xylene, etc. may be used. Although such addition of the hydrocarbon is not necessary to the process, the use of the hydrocarbon diluent has the following advantages:

(1) The diluent aids in controlling the reaction of the alcohol and aluminum metal. A large amount of heat is liberated during the formation of the alcoholate and the use of the hydrocarbon diluent aids in the dissipation of this heat;

(2) The hydrocarbon serves as a solvent for the solid aluminum alcoholate; and (3) The hydrocarbon diluent greatly aids in the separation and recovery of the alcohol from the aluminum oxide slurry after hydrolysis.

In the presence of a small amount of a catalyst in the present process, aluminum metal is reacted with the alcohol and the resulting alcoholate is then hydrolyzed with water or an aqueous medium such as a hydrosol or an aqueous impregnating solution. This hydrolysis results in the formation of a hydrous alumina which is dispersed in the aqueous phase in the form of a slurry.

The formation of the aluminum alcoholate takes place in accordance with the following equation:

EQUATION I

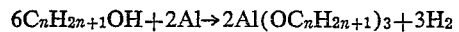

$6C_nH_{2n+1}OH + 2Al \rightarrow 2Al(OC_nH_{2n+1})_3 + 3H_2$

The hydrogen is in the gaseous state and escapes from the reaction. Upon hydrolysis, the aluminum alcoholate undergoes the following change:

EQUATION II

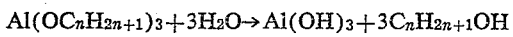

$Al(OC_nH_{2n+1})_3 + 3H_2O \rightarrow Al(OH)_3 + 3C_nH_{2n+1}OH$ the alcohol being reformed and recoverable.

When using water insoluble alcohol the alcohol which is reformed or regenerated by the hydrolysis step together with the hydrocarbon forms a layer separate and distinct from the slurry of water and hydrous alumina and is easily recovered and removed by a simple process of decanting or the like. The slurry of hydrous alumina is removed for further treatment.

The water-insoluble alcohol-hydrocarbon mixture contains a small amount of residual water as entrained and dissolved water and is freed from this residual water by a simple process of distillation for reuse in the process. The overhead gases from the drying still are condensed, the condensate allowed to settle and upon settling, separates into a water layer and an alcohol-hydrocarbon layer, the latter being recycled to the drying still. The dried alcohol-hydrocarbon mixture is removed from the bottom of the drying still and is ready for further reaction with additional metallic aluminum.

When using a water soluble alcohol for reacting with aluminum to form the alcoholate which is then hydrolyzed to form a water slurry of alumina, the alcohol goes into the water solution and may be recovered by distillation. The recovered alcohol is then dehydrated to anhydrous form before it is again used for reacting with additional metallic aluminum.

If an alumina gel is desired, the slurry of hydrous alumina obtained as described above may be dried and activated by application of heat. If it is desired to modify the properties of the gel, the slurry may be treated in various ways before drying, i. e., the hydrogen ion concentration may be adjusted, an aging treatment at controlled temperatures may be used, or a peptizing agent may be added to convert the alumina into a hydrosol.

If an alumina base catalyst is desired, the alumina slurry may be treated with an impregnating solution of a catalytic material before drying, e. g. a solution of ammonium molybdate, chromic acid, or other catalytic or promoter agent may be added to the slurry.

Instead of hydrolyzing the aluminum alcoholate with water, it is preferably hydrolyzed with a silica hydrosol so that the water needed for the hydrolysis is supplied by the hydrosol and there results an intimate coprecipitation of silica and alumina. The use of a purified silica hydrosol, substantially free of dissolved ions, is especially desirable since this results in a very pure coprecipitate of silica and alumina in intimate admixture which requires no subsequent washing or other purification. Instead of using silica hydrosol, an aqueous impregnating solution containing a catalytic or promoting agent may be used to hydrolyze the aluminum alcoholate.

Petroleum naphtha and similar hydrocarbon mixtures containing appreciable quantities of naphthenes can be subjected to a reforming operation to yield a liquid product of improved octane number boiling within the gasoline range. Depending upon reaction conditions, catalytic reforming operations are generally referred to as either hydroforming or aromatization reactions. By hydroforming is ordinarily meant an operation conducted at elevated temperatures and pressures in the presence of a solid catalyst and added hydrogen wherein a hydrocarbon fraction is increased in aromaticity and wherein there is no net consumption of hydrogen. The term aromatization refers to an operation in which a hydrocarbon or hydrocarbon fraction is treated at elevated temperatures but at substantial atmospheric pressure in the presence of a solid catalyst for the purpose of increasing the aromaticity of the hydrocarbon or hydrocarbon fraction.

Catalytic reforming operations are usually carried out at temperatures of around 850° to 1100° F. in the presence of such catalysts as molybdenum oxide, chromium oxide and the like. These catalysts are usually supported on a base or carrier, the most commonly used base being alumina. In this invention, alumina based catalysts consisting of one or more of the Group VI oxides such as molybdenum oxide or chromium oxide, supported on alumina have been prepared and used as reforming catalysts.

In addition to the reforming processes, high boiling hydrocarbon materials may be converted to low boiling hydrocarbon materials by a process of catalytic cracking carried out by subjecting the high boiling hydrocarbon material to active conditions of temperature and pressure for sufficient period of time in the presence of catalysts such as alumina, alumina-boria, alumina-silica, alumina-magnesia, alumina-silica-magnesia and the like. The catalyst may be in the form of fixed or moving bed with the vaporized high boiling hydrocarbon material passing therethrough or the so-called fluid technique may be used in which the catalyst material is suspended in vapors of high boiling hydrocarbon material during reaction time. Other catalytic conversions of hydrocarbons or other compounds may be practical using catalysts prepared according to the present process.

The preferred method of making alumina is from the aluminum alcoholate because it is a cheaper and faster method of making a pure alumina. Aluminum metal in the form of chips, shot, turnings, ingots or the like is reacted with a substantially anhydrous alcohol preferably an aliphatic alcohol such as amyl alcohol or commercial mixtures containing isomeric amyl alcohols. Water soluble aliphatic alcohols such as ethyl, isopropyl or normal propyl alcohols etc. may be used but usually $C_5$ and higher aliphatic alcohols which are liquid at the temperature of operation of the process are preferred because they are less soluble in water and more easily recovered in the process. Or mixtures of different alcohols may be used. In some cases a selected hydrocarbon, such as heptane, octane, toluene, xylene, etc., or a hydrocarbon fraction such as a petroleum distillate boiling within the range of 200° to 500° F. or higher is added to the alcohol selected. It is preferred to use a petroleum distillate of narrow boiling range which includes the boiling range of the alcohol used; for example, for use with mixed amyl alcohols a petroleum cut boiling within the range of 200° to 290° F. is satisfactory.

My process will be first described using a mixture of equal volumes of amyl alcohol and a petroleum hydrocarbon fraction boiling in the range of 220° to 290° F. to show the general process and then specific examples will be given in which water soluble alcohols are reacted with aluminum metal to give the alcoholates. A small amount of catalytic material such as mercuric chloride is preferably used but other catalysts such as mercury salts, iodine, aluminum halide, etc. may be used. The catalyst may be added with the aluminum metal or may be separately added. The reaction zone may be maintained at atmospheric or under superatmospheric pressure of about 5 to 100 lbs. per sq. in. gauge, preferably about 25 lbs. per sq. in. gauge. The superatmospheric pressure raises the boiling point of the alcohol and hydrocarbon and aids in their retention in the reaction system. The amount of catalyst used may be about 0.001 part of mercuric chloride per part of aluminum metal by weight.

It is usually necessary to heat the reaction mixture to initiate the reaction between the aluminum and the alcohol. After the reaction is well started, the reaction becomes rapid and it is usually necessary to cool the reaction mixture. The reaction mixture is heated initially to a temperature of about 200° to 300° F., preferably about 265° F. The temperature which is maintained will depend upon the particular alcohol and petroleum hydrocarbon fraction used and upon the pressure that it is desired to maintain. Preferably the reaction mixture is maintained at a temperature of about 200° F. to 300° F.

The aluminum and alcohol react to form aluminum alcoholate or aluminum alkoxide and hydrogen. Vapors and gases passing overhead may be cooled and condensed liquid and pure hydrogen may be recovered.

The products of reaction comprising a solution of aluminum alcoholate in hydrocarbon and excess alcohol are passed into a hydrolysis zone which may be a two-fluid mixing nozzle, or a centrifugal pump for thoroughly mixing the liquids. Also passing into the hydrolysis zone is water or an aqueous medium such as hydrosol or an impregnating aqueous solution to hydrolyze the aluminum alcoholate forming hydrous alumina and regenerating the alcohol in accordance with Equation II, above given. The temperature during hydrolysis may be between about 70° and 200° F. During hydrolysis with the silica hydrosol, the alcoholate is hydrolyzed and some water is removed from the hydrosol to form a silica alumina composite which can be dried and used as a cracking catalyst. Or when using an aqueous impregnating solution, the alcoholate is hydrolyzed and the alumina formed is impregnated with the solution.

From the hydrolyzing zone, the mixture of hydrocarbon, regenerated alcohol, water and hydrous alumina is transferred to a settling and separating zone where the mixture is allowed to remain in a substantially quiescent state for about 1 to 10 hours, but very slow stirring aids in the separation. The mixture separates into two distinct layers, the upper layer being an alcohol-hydrocarbon layer and the lower one being a water layer containing hydrous alumina in the form of a slurry. The temperature of the mixture in the settling zone should be about 70° to 200° F., preferably 150° to 180° F. since settling seems to be somewhat better in this range.

When hydrolyzing with water or a silica hydrosol or an impregnating solution, the water, hydrosol or solution should be used in such amounts to give about a 3% to 5% by weight slurry of alumina or impregnated alumina in the aqueous layer. For example, for each 100 grams of aluminum metal used, about 3.5 to 6 liters of water, hydrosol or aqueous solution should be used. The alumina slurry is readily concentrated to as high as 10% solids content by continued settling. Water withdrawn from the top of the settled slurry may be reused in the hydrolysis step to recover any suspended alumina it may contain.

The slurry of hydrous alumina may be dried to make alumina gel or it may be impregnated with a solution of a catalytic component and the mixture dried. The drying should be carried out at a temperature between about 220° and 500° F. depending on the catalytic material treated and the results desired. Or the hydrous alumina or concentrated slurry of alumina may be mulled with a dry catalytic component such as for example zinc oxide. Or the dried alumina gel may be impregnated with a solution of the desired catalytic component and then dried.

The alcohol-hydrocarbon mixture forming the upper layer in the settling zone above referred to is withdrawn and passed to a drying still for removing any entrained or dissolved water in a simple distillation step. When using a 50-50% by volume mixture of amyl alcohol and hydrocarbon diluent boiling within the range of 220-290° F., for example, this distillation temperature will be about 250° to 280° F. Water vapors passing overhead from the distillation step contain some alcohol-hydrocarbon mixture and upon condensation of the vapors and passing to a settling zone, gravity separation takes place to form a bottom water layer and a top alcohol-hydrocarbon layer. The water from the water layer may be used in the hydrolysis step. The alcohol-hydrocarbon layer is returned to the drying distillation step. The alcohol-hydrocarbon mixture which is substantially completely freed of water is used for dissolving or reacting with more aluminum metal.

When using a water soluble alcohol such as isopropyl alcohol, the anhydrous alcohol is reacted with aluminum metal using a catalyst such as iodine. After the reaction is complete, the aluminum isopropylate is hydrolyzed with water or silica hydrosol or an aqueous impregnating solution to form a slurry of hydrous alumina or impregnated hydrous alumina which may be further treated as desired. Following hydrolysis the isopropyl alcohol is distilled out of the slurry and may be dehydrated for reuse in reacting with more aluminum metal. Examples using isopropyl alcohol will be given hereinafter.

The invention is further described and illustrated by the following examples.

Example 1

54 g. of aluminum turnings were dissolved in two liters of a mixture of anhydrous n-amyl alcohol and a petroleum distillate boiling within a range of from 300° to 400° F. The mixture of alcohol and petroleum distillate was in a ratio of one part of alcohol to one part of petroleum distillate, by volume. A small amount of mercuric chloride, about 0.001 part of mercuric chloride per part of aluminum metal by weight was added. To initiate the reaction, the mixture was heated to boiling, after which the reaction proceeded to completion without further heating.

The solution of aluminum amylate thus obtained was hydrolyzed with 3.5 liters of distilled water. There was formed an aqueous slurry of hydrous alumina, from which the petroleum distillate-regenerated alcohol mixture readily separated as a separate liquid layer. This liquid layer was decanted and dried by distilling off the water and reused in a subsequent preparation without further treatment.

The alumina slurry was allowed to settle overnight and the layer of clear water was decanted, leaving a concentrated slurry containing approximately 8% alumina. This concentrated slurry was dried in an oven at 220° F. and then activated by heating to 850° F. The product was a hard, highly adsorptive alumina gel. Its surface area was 356 square meters per gram, which is one of the highest ever encountered for pure alumina. This product has many uses. It may be used as an adsorptive agent, as a catalyst or as a catalyst base in desulfurization processes and the like.

Example 2

A solution of aluminum amylate was prepared by dissolving 432 g. of aluminum metal in 16 liters of a 50-50 mixture of amyl alcohol and a petroleum distillate boiling in the range of 300° to 400° F., in the presence of 0.2 g. of mercuric chloride. To initiate the reaction, the mixture was heated to boiling by means of a steam coil. After the reaction was well started, cooling was necessary. The cooling was done by means of a coil immersed in the reaction mixture. Toward the end of the reaction, the mixture was again heated to complete the solution of the metal. About 30 minutes is required for the reaction between the aluminum and the alcohol by the procedure described.

A silica hydrosol was prepared by passing 3650 cc. of a solution of sodium silicate ($Na_2O.3.25\ SiO_2$) containing 30 g. of silicon dioxide per liter through a bed of 2250 cc. of an acid regenerated cation exchange resin. Any commercial cation exchange resin such as an insoluble polymer prepared from acidic monomers such as phenols, phenol sulphonic acid or phenol carboxylic acid, or a sulphonated carbonaceous material such as sulphonated coal, sulphonated peat, etc. may be used. Amberlite IR-100 (Resinous Products Co.) believed to be made by reacting a phenol sulphonic acid with formaldehyde was used in this example. This sol prepared in this manner gave an acid reaction toward litmus and contained approximately 28 g. of silicon dioxide per liter.

1570 cc. of the above silica sol was diluted to 16 liters with distilled water and this diluted sol was used to hydrolyze the aluminum amylate solution. The hydrolysis was accomplished by passing the two liquids simultaneously through a small centrifugal pump as described in Example 3. Upon settling there formed an aqueous slurry of hydrous alumina and hydrous silica from which the petroleum distillate-regenerated alcohol readily separated as a separate liquid layer. This liquid layer was decanted and dried by distilling off the residual water and was reused in a subsequent preparation without further treatment.

The aqueous slurry of hydrous alumina and hydrous silica was dried in an oven at 250° F. and activated by heating at 850° F.

The product which is useful as a cracking catalyst was a hard, adsorptive alumina-silica catalyst comprising 95% aluminum oxide and 5% silicon dioxide. Its surface area was 429 square meters per gram.

Example 3

A silica hydrosol is prepared by passing a solution of sodium silicate ($Na_2O.3.25\ SiO_2$) containing 30 g. of silicon dioxide per liter through a bed of an acid regenerated cation exchange resin. The volume ratio of the sodium silicate solution to the bed of cation exchange resin is 1.6 to 1. The sol prepared in this manner is acid in its reaction to litmus and contains about 28 g. of silicon dioxide per liter.

54 g. of aluminum turnings are dissolved in 2 liters of a 50-50 mixture of amyl alcohol and a petroleum hydrocarbon boiling in the range of 300° to 400° F. About 0.1 g. of mercuric chloride is used as a catalyst for the reaction. The mixture is heated to initiate the reaction, but after the reaction is well started it is necessary to apply cooling.

The solution of aluminum amylate thus obtained is hydrolyzed with 24.5 liters of silica hydrosol prepared as above set forth in this example. The hydrolysis is accomplished by pumping the aluminum amylate solution and the silica hydrosol simultaneously through a small centrifugal pump. The feed lines to the pump are so constructed that the two streams are mixed just before reaching the impeller of the pump. The discharge from the pump comprises a slurry of hydrous silica-alumina gel containing the regenerated alcohol and hydrocarbon. A portion of the regenerated alcohol and hydrocarbon separates from the aqueous slurry upon settling and is decanted and the remainder of the regenerated alcohol and hydrocarbon is recovered from the aqueous slurry by distillation. The regenerated alcohol and hydrocarbon mixture is dried by distilling the water from it and is re-used for dissolving more aluminum metal. The aqueous slurry of hydrous silica-alumina gel is aged for a period of 5 hours at about 200° F. and is finally dried at about 250° F.

The product is a hard adsorptive gel comprising about 13% alumina and 87% silica on a dry basis. This material when used to crack an East Texas light gas oil of 32° API gravity in a fixed bed operation at 900° F. and 2 v./v./hr. for ½ hour cycles gives about 65% conversion to cracked products. When steamed for 24 hours at 1050° F. and 60 p. s. i. g. before use in the cracking test the conversion to cracked products is 35.4%.

Example 4

216 g. of aluminum turnings are dissolved in 4 liters of anhydrous isopropyl alcohol. About 0.25 g. of iodine are used as catalysts for the reaction. Heat is applied to initiate the reaction but cooling is applied after the reaction is well started. After the reaction slows down the mixture is again heated to complete the reaction. About 2 hours are required to complete the reaction. After completion of the reaction the solution of aluminum isopropylate is hydrolyzed with 8 liters of water containing about 180 g. of dissolved boric acid. The hydrolysis is accomplished by simultaneously pumping the aluminum isopropylate solution and the boric acid solution through a small centrifugal pump. The regenerated isopropyl alcohol is distilled out of the slurry and may be dehydrated for reuse. The aqueous slurry is dried at about 250° F. to produce a hard adsorptive gel comprising about 80% alumina and 20% boria on a dry basis. This gel is useful as a catalyst for hydrocarbon conversions.

Example 5

216 g. of aluminum turnings are dissolved in 4 liters of isopropyl alcohol as in Example 4. The solution of aluminum isopropyl is hydrolyzed with a mixture comprising 7 liters of water, 1 liter of silica hydrosol from Example 3 and 50 cc. of acetic acid. After removal of the isopropyl alcohol by distillation, 1 liter of a solution of ammonium molybdate containing 48.5 g. of molybdena is added and the slurry is dried at about 250° F. The product comprises about 84.2% alumina, 5.8% silica and 10% molybdena on a dry basis. It is useful as a catalyst for reforming.

Example 6

54 g. of aluminum turnings are dissolved in one liter of isopropyl alcohol as in Example 4. The solution of aluminum isopropylate is hydrolyzed by vigorously mixing with 24.5 liters of silica hydrosol from Example 3. The regenerated isopropyl alcohol is distilled from the mixture and the aqueous slurry is dried at about 250° F. The product is a hard, adsorptive gel comprising about 13% alumina and 84% silica on a dry basis.

Example 7

216 g. aluminum turnings are dissolved in 4 liters of isopropyl alcohol as in Example 4. The solution of aluminum isopropylate is hydrolyzed with 12 liters of ammonium vanadate solution containing 45 g. of vanadium pentoxide. After recovery of the regenerated alcohol by distillation the slurry is dried at about 250° F. The product comprises about 90% alumina and 10% vanadia on a dry basis and is useful as a catalyst for reforming naphtha.

Example 8

216 g. of aluminum turnings are dissolved in 4 liters of isopropyl alcohol as in Example 4. The solution of aluminum isopropylate is hydrolyzed with 12 liters of ammonium tungstate solution containing 45 grams of tungsten oxide. After recovery of the regenerated isopropyl alcohol by distillation the slurry is dried at about 250° F. The product comprises about 90% alumina and 10% tungstia on a dry basis and is useful for reforming naphtha.

Example 9

216 g. of aluminum turnings are dissolved in 4 liters of isopropyl alcohol as described in Example 4. The solution of aluminum isopropylate is hydrolyzed with 8 liters of phosphoric acid solution containing 24 g. of $P_2O_5$. After recovery of the regenerated isopropyl alcohol by distillation, 1 liter of chromic acid solution equivalent to 48 g. of $Cr_2O_3$ is added to the slurry and the mixture is dried at about 250° F. The product comprises about 85% alumina, 5% phosphoric acid as $P_2O_5$ and 10% chromia. It is useful as a reforming catalyst.

Example 10

216 g. of aluminum turnings are dissolved in 4 liters of isopropyl alcohol as described in Example 4. The solution of aluminum isopropylate is hydrolyzed with 8 liters of ammonium molybdate solution containing 45 g. of molybdena. After recovery of the isopropyl alcohol by distillation the slurry is dried at about 250° F. The product comprises about 90% alumina and 10% molybdena on a dry basis. It is useful as a reforming catalyst.

Example 11

216 g. of aluminum turnings are dissolved in 8 liters of 50–50 amyl alcohol-hydrocarbon mixture as in Example 3. The solution of aluminum amylate is hydrolyzed with 10 liters of silica hydrosol from Example 3 to produce a slurry of hydrous alumina-silica gel. The regenerated alcohol-hydrocarbon is recovered partly by decantation and partly by distillation as described in Example 3. 100 cc of 28% ammonia solution is added to the aqueous slurry which is then aged for 24 hours at about 80° F., and dried at about 250° F. to produce a hard adsorptive gel comprising about 60% alumina and 40% silica. This gel is useful as a catalyst for hydrocarbon conversions.

Example 12

108 g. aluminum turnings are dissolved in 4 liters of 50–50 amyl alcohol and petroleum fraction in the manner described in Example 3. This solution of aluminum amylate is hydrolyzed with 22 liters of silica sol from Example 3. There is produced a slurry of hydrous silica-alumina gel. The regenerated alcohol-hydrocarbon mixture is recovered by decantation and distillation as described in Example 3. The aqueous slurry is aged 5 hours at about 200° F., dried at about 250° F. to produce a hard adsorptive gel comprising about 25% alumina and 75% silica on a dry basis. This gel is useful as a catalyst for hydrocarbon conversions.

Example 13

216 g. of aluminum turnings are dissolved in 8 liters of 50–50 amyl alcohol and petroleum distillate as described in Example 3. The solution of aluminum amylate is hydrolyzed with 22 liters of silica sol from Example 3 to produce a slurry of hydrous silica-alumina gel. The regenerated alcohol-hydrocarbon mixture is recovered partly by decantation and partly by distillation as described in Example 3. 50 cc. of glacial acetic acid is added to the aqueous slurry which is then aged for 5 hours at about 200° F. and dried at about 250° F. to produce a hard adsorptive gel comprising about 40% alumina and 60% silica. This gel is useful as a catalyst for hydrocarbon conversions.

The various compositions above described may be made in spherical or spheroidal form by emulsifying the sols or mixtures in oil or water immiscible or partially water miscible liquids like normal butanol to form gels or the sols or mixtures thereof may be passed through oil baths or n-butanol baths to form spherical-like particles.

Operable variations of the preparation of hydrogel microspheres include formation of the water slurry of hydrous alumina and then drying by spraying the slurry into a gas such as air or flue gas which is at a temperature within a range of 150° to 800° F.

The slurry may also be sprayed into an atmosphere that is chemically active such as an atmosphere containing ammonia, methylamine, sulphur dioxide, hydrogen sulphide, boron trifluoride and the like. The water slurry of alumina may also be converted to a hydrosol and then dried in the form of microspheres by the spray drying technique. Solutions of a source of catalytic or promotor material may be added to the water slurry of hydrous alumina before drying, or to the dried alumina hydrogel microspheres after drying whether the microspheres are made by the emulsification of the hydrosol, by spray drying the hydrosol, or by spray drying the water slurry of hydrous alumina. These solutions of catalytic or promoter materials include solutions of a silica hydrosol, ammonium molybdate, ammonium dichromate, ammonium metavanadate, potassium dichromate, potassium nitrate, cerium nitrate, calcium nitrate, chromic acid, boric acid, tungstic acid, etc.

Although the described embodiment of the invention is a continuous process, the invention may be carried out as a batch process with only minor changes in the described steps obvious to one familiar with the art.

While certain of the specific examples above given on hydroforming and catalytic cracking processes recite the preferred conditions of temperature and pressure, the following ranges may be used. For hydroforming reactions, the temperature may vary between 850° and 1100° F., the pressure between atmospheric and 400 p. s. i. g., the hydrocarbon feed rate between 0.1 and 2 volumes of liquid feed per volume of catalyst per hour and the hydrogen feed rate between 1,000 and 4,000 cu. ft. under standard conditions per barrel of feed.

In catalytic cracking processes, temperatures may vary from 850° to 1100° F., pressures from atmospheric to 100 p. s. i. g. and the feed rate from 0.2 to 4 volumes of oil per volume of catalyst per hour. Catalyst to oil feed ratios by weight from 1:1 to 30:1 may be used in the fluid process.

Although in the examples given above, the catalytic materials made by the process were dried at temperatures of 250° F. and were activated by heating to 850° F. these temperatures are not critical. The catalytic material is dried until the moisture content is reduced to from 5 to 30% by weight. This drying may be carried out at temperatures ranging from 250° to 400° F.

Cracking catalysts are activated by heating to a temperature within the range of 800° to 1100° F. for a period of from 1 to 8 hours, preferably 3 hours. Hydroforming catalysts are activated by heating to a temperature within a range of 850° to 1450° F. for from 1 to 8 hours, preferably 6 hours. However, the activation may be omitted entirely, if desired.

In hydrocarbon conversion operations where carbonaceous material is deposited on the catalytic material, it is contemplated that the catalytic material will be regenerated by treating it with a regenerating gas such as air or other suitable gases and regenerated catalyst reused.

Catalytic substances other than those described above may be prepared according to this invention. Alumina and alumina based catalysts used in processes such as adsorption, dehydration, dehydrogenation, hydrogenation, esterification, isomerization, condensation, polymerization, and amination may be prepared by this process.

This case is filed as a continuation-in-part of my application Serial No. 60,864 filed November 19, 1948 entitled "Conversion of Hydrocarbons and Catalysts Useful Herein," now Patent No. 2,636,865, granted April 28, 1953.

What is claimed is:

1. A process for preparing an alumina-containing catalyst adapted for the conversion of hydrocarbon oils, which comprises providing an anhydrous solution of an alcoholate of aluminum, effecting intimate admixing of the solution of the alcoholate of aluminum and an aqueous impregnating solution containing a catalytic component, hydrolyzing the alcoholate of aluminum by and reacting the alcoholate with the water in the impregnating solution to form hydrous alumina and to form a water slurry of the hydrous alumina impregnated with said catalytic component, and drying and activating the impregnated hydrous alumina particles to form a catalyst.

2. A process according to claim 1 wherein the aqueous impregnating solution comprises silica hydrosol containing water which upon admixture with the anhydrous solution of aluminum alcoholate hydrolyzes the aluminum alcoholate to form hydrous alumina and an intimate coprecipitation of silica and alumina is effected and the hydrous silica-alumina mixture is then dried and activated.

3. A process for preparing silica-alumina catalyst adapted for conversion of hydrocarbon oils, which comprises providing an anhydrous solution of an aluminum alcoholate, effecting intimate admixing of the aluminum alcoholate solution and silica hydrosol to cause intimate coprecipitation of silica and alumina, hydrolyzing the aluminum alcoholate by and reacting the aluminum alcoholate with the water in the silica hydrosol to form a hydrous silica-alumina composite and forming a water slurry of the resulting hydrous silica-alumina composite, and recovering and drying the silica-alumina composite to produce a catalyst.

4. A process according to claim 3 wherein the aluminum alcoholate is derived from a $C_3$ to $C_5$ aliphatic alcohol.

5. A process for preparing silica-alumina catalyst adapted for conversion of hydrocarbon oils, which comprises providing an anhydrous solution of an aluminum alcoholate, effecting intimate admixing of the aluminum alcoholate solution and silica hydrosol to cause intimate coprecipitation of silica and alumina, hydrolyzing the aluminum alcoholate by and reacting the aluminum alcoholate with the water in the silica hydrosol to form a hydrous silica-alumina composite and forming a water slurry of said hydrous silica-alumina composite, removing alcohol resulting from the hydrolysis step from the mixture, impregnating the hydrous silica-alumina composite with a solution of a catalytic substance and drying and recovering as a catalyst silica-alumina impregnated with a catalytic substance.

6. A process according to claim 5 wherein the solution of a catalytic substance comprises ammonium molybdate.

7. A process according to claim 1 wherein the impregnating solution contains ammonium molybdate.

8. A process according to claim 1 wherein the impregnating solution contains boric acid.

References Cited in the file of this patent

UNITED STATES PATENTS

| | | |
|---|---|---|
| 2,292,708 | Mavity | Aug. 11, 1942 |
| 2,337,421 | Spence et al. | Dec. 21, 1943 |
| 2,348,647 | Reeves et al. | May 9, 1944 |
| 2,371,237 | Heard | Mar. 13, 1945 |